United States Patent
Maile et al.

(10) Patent No.: US 10,022,754 B2
(45) Date of Patent: Jul. 17, 2018

(54) FILLING MACHINE AND METHOD FOR INTERMEDIATE CLEANING OF A FILLING MACHINE

(71) Applicant: Albert Handtmann Maschinenfabrik GmbH & Co. KG, Biberach (DE)

(72) Inventors: Bernd Maile, Oggelshausen (DE); Martin Staudenrausch, Biberach (DE); Gunter Sailer, Laupheim (DE); Martin Widmann, Ravensburg (DE)

(73) Assignee: Albert Handtmann Maschinenfabrik, GMBH & CO., KG, Biberach (DE)

( * ) Notice: Subject to any disclaimer, the term of this patent is extended or adjusted under 35 U.S.C. 154(b) by 484 days.

(21) Appl. No.: 14/789,955

(22) Filed: Jul. 1, 2015

(65) Prior Publication Data
US 2016/0008856 A1 Jan. 14, 2016

(30) Foreign Application Priority Data
Jul. 8, 2014 (EP) .................................... 14176068

(51) Int. Cl.
*B08B 9/00* (2006.01)
*A22C 11/02* (2006.01)

(52) U.S. Cl.
CPC ............... *B08B 9/00* (2013.01); *A22C 11/02* (2013.01)

(58) Field of Classification Search
CPC ..... A22C 11/00; A22C 11/02; A22C 11/0245; A22C 11/0263; A22C 11/10; A22C 11/12
USPC ........... 452/21–26, 30–32, 35–37, 46–48, 51
See application file for complete search history.

(56) References Cited

U.S. PATENT DOCUMENTS

| | | | |
|---|---|---|---|
| 4,501,622 A | 2/1985 | Marchadour | 134/18 |
| 5,621,194 A | 4/1997 | Koyama et al. | 177/25.18 |
| 2008/0142042 A1 | 6/2008 | Bramsen | 134/18 |

FOREIGN PATENT DOCUMENTS

| | | |
|---|---|---|
| EP | 2 384 635 | 11/2011 |
| JP | 01294485 A2 | 11/1989 |
| JP | 5-1711762 B2 | 3/1993 |
| JP | 05292933 A2 | 11/1993 |
| JP | 06317456 A2 | 11/1994 |
| JP | 9-500578 | 1/1997 |
| JP | 10277510 A2 | 10/1998 |
| JP | 11138119 A2 | 5/1999 |
| JP | 2000-287859 | 10/2000 |
| JP | 2002-034439 | 2/2002 |
| JP | 2002-066489 | 3/2002 |
| JP | 2010-513022 | 4/2010 |

OTHER PUBLICATIONS

Effiong Essien et al, "Sausage Manufacture Principles and Practice", In: "Sausage Manufacture", Sep. 2, 2003, pp. 1-93.
Search report dated Jan. 13, 2015 in corresponding EP Application No. EP 14 17 6068.
Notice dated May 17, 2016 in corresponding JP Application No. 2015-103777 with English Translation.

*Primary Examiner* — Richard T Price, Jr.
(74) *Attorney, Agent, or Firm* — Fattibene and Fattibene llc; Paul A. Fattibene

(57) ABSTRACT

A filling machine and a method for intermediate cleaning of a filling machine, where the filling machine comprises a hopper for filling in a pasty substance, a conveying mechanism for conveying the pasty substance in the direction toward an outlet opening. The filling machine comprises at least one spraying device above or within the hopper for distributing the cleaning medium onto the hopper inner wall.

18 Claims, 8 Drawing Sheets

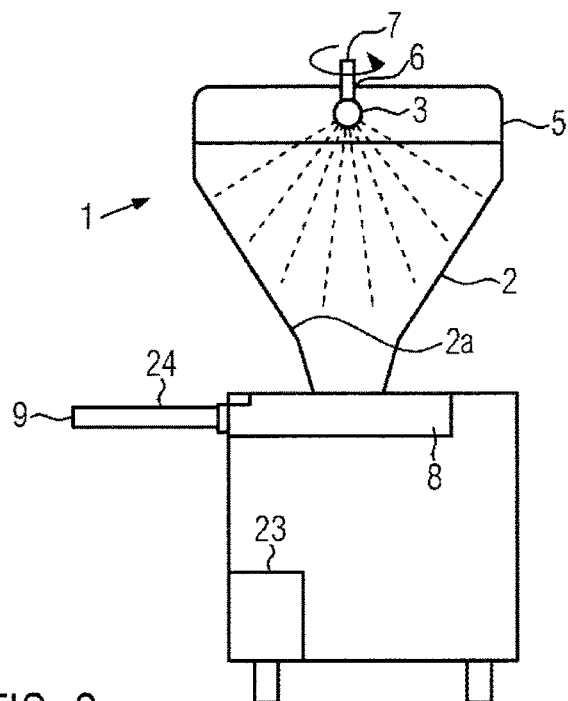
FIG. 2
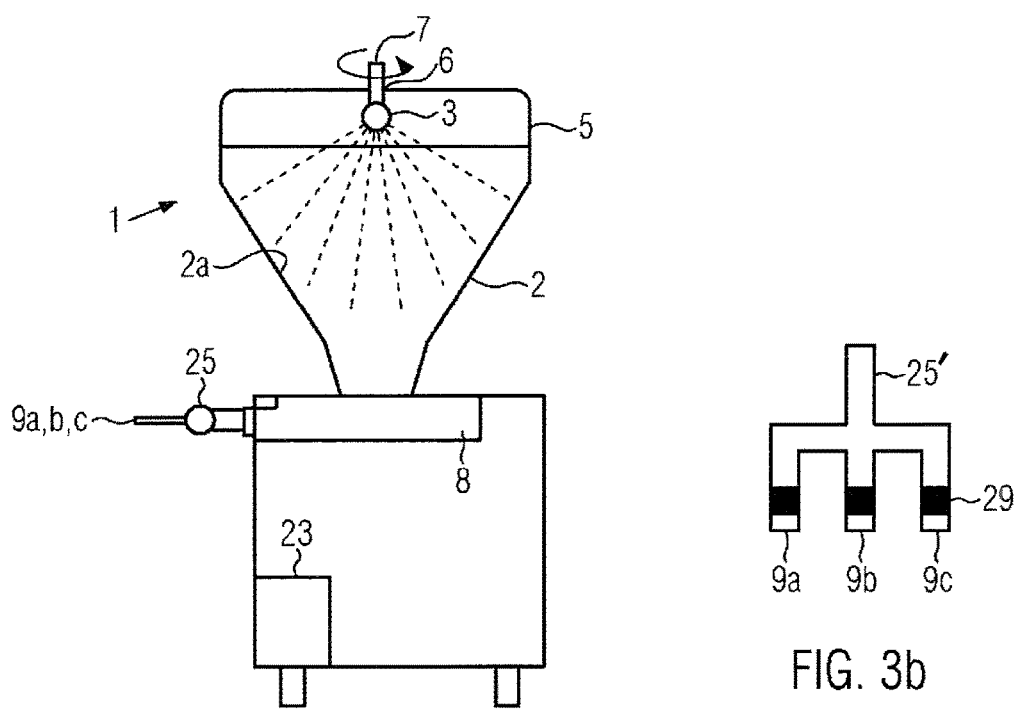
FIG. 3a
FIG. 3b

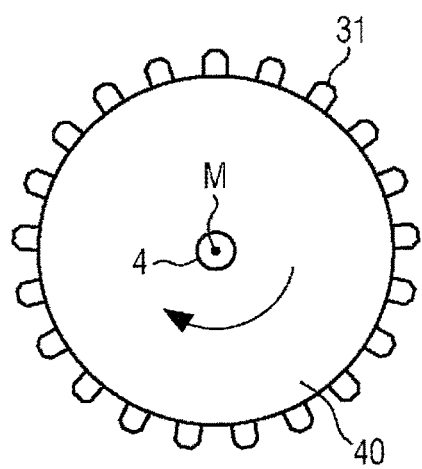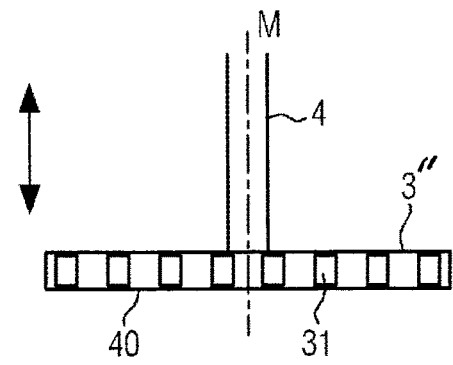
FIG. 7c　　　　　　FIG. 7d
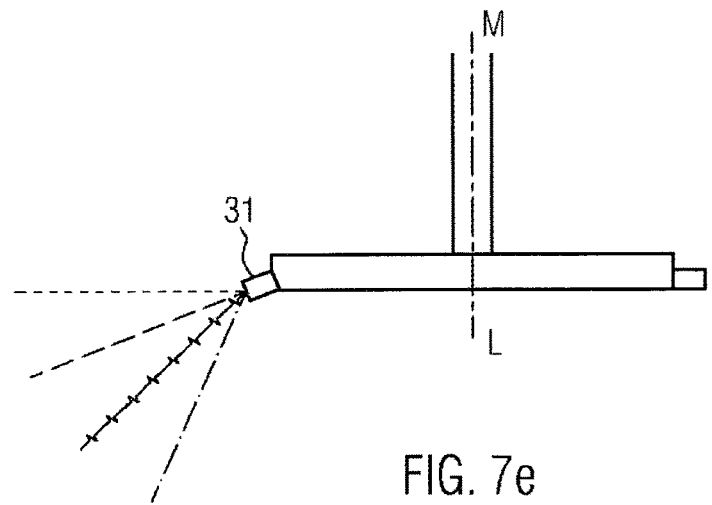
FIG. 7e
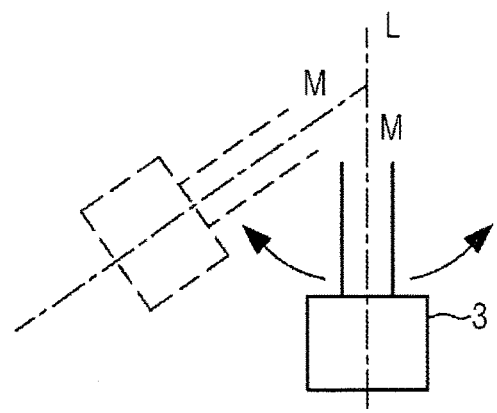
FIG. 7f

FILLING MACHINE AND METHOD FOR INTERMEDIATE CLEANING OF A FILLING MACHINE

FIELD OF THE INVENTION

The invention relates to a filling machine and a method for intermediate cleaning of a filling machine.

BACKGROUND OF THE INVENTION

Due to the universal range of application of filling machines, in particular vacuum filling machines, so-called product changes frequently occur in these machines during production. This means that several different products are produced during one work shift. In order to avoid contaminating or mixing the subsequent product with remnants of the previously filled product, the entire area exposed to the product and all components installed therein must be cleaned manually by use of foam and/or high pressure processes.

To be able to clean all regions of the product area of the machine, the process is as follows:
1. Opening a conveying mechanism, in particular opening a swivel housing and removing all components to be cleaned, such as the rotor, the pump impeller, the clamping eccentric etc.
2. Cleaning the removed components with a high pressure cleaner or with foam.
3. Cleaning all areas of the filling machine exposed to the product, i.e. the hopper interior, the entire feeding area, the conveying mechanism area, the outlet area by use of a high pressure cleaner or foam.
4. Assembling the components removed and closing the conveying mechanism and the swivel housing, respectively.

Other preparations for changing over to the subsequent product can during this time not be performed at the machine. The cleaning process is involved and takes a relatively long time, typically about 15 minutes, but up to 60 minutes for some products. Since all cleaning steps are performed manually, process-safe cleaning is not guaranteed.

SUMMARY OF THE INVENTION

Starting out from there, the present invention is based on the object of reducing the time required for intermediate cleaning and thereby the downtime of the machine, where the cleaning process is to be effected both in a more process-safe and reproducible manner than previously.

According to the invention, this object is satisfied by the features of the invention and claims.

The filling machine according to the invention is in particular used for the production of sausages, i.e. an elongated strand. Such a filling machine is advantageously designed as a vacuum filling machine. Such a filling machine, in addition to a hopper for filling a pasty substance, comprises a conveying mechanism, in particular a vane cell pump for conveying the pasty substance in the direction of an outlet opening. The filling machine comprises at least one spraying device above or within the hopper for distributing the cleaning medium onto the hopper inner wall. This makes manual cleaning unnecessary. The jets of the cleaning medium remove product residues in the hopper area. The cleaning medium and product mixture is by the conveying mechanism moved to the outlet opening and then exits the filling machine through the outlet opening. The entire area of the machine exposed to the product is cleaned in this manner. Since the cleaning medium is also moved in the conveying mechanism, i.e., e.g. in the conveying cells of a vane cell pump, the individual chambers of the conveying mechanism can be cleaned very well. The spraying device can according to the invention there be either structurally attached to the filling machine, for example, via a corresponding attachment device, e.g. at the hopper or a cover. However, it is also possible that the spraying device is held on a separate support in such a manner that it is during intermediate cleaning disposed above or within the hopper. A corresponding support can then be attached or held, for example, to/at the ceiling, the wall or the base of the production room.

The exact location and configuration of the spraying device is determined depending on the application. The spraying device can be equipped with different jet shapes. The spraying device can be designed as a spray head, in particular a spray ball, or as a nozzle head, in particular a nozzle wheel. The respective heads can there be configured as having a single or multiple jets. A spray head or a spray ball, respectively, is a simple device for distributing the cleaning liquid onto the hopper wall. For this purpose, the spray head or the spray ball, respectively, has multiple bores through each of which a jet of cleaning medium impacts the hopper wall. During cleaning, a flow simultaneously passes through all bores.

However, the spraying device can also be designed as a head which comprises at least one, preferably multiple nozzles that spray the cleaning medium onto the hopper inner wall.

In a static spraying device, the respective jet respectively impacts at the same spot on the hopper inner wall. It is therefore advantageous if the spraying device is designed to be movable such that the one or multiple jets do not impact at the same spot of the hopper wall.

The spraying device can advantageously be configured such that it can rotate about a first axis, i.e., is in particular designed rotationally and can rotate about its center axis. A respectively rotating spraying device enables the entire inner surface of the hopper to be reached by the rotation. The water jets clean the hopper inner surface and assembly components. The spraying device can there be designed such that it is driven by the water pressure and performs a rotating motion. A suitable electric, pneumatic, etc. drive can alternative also be provided.

It is according to a particular embodiment also possible that the spraying device additionally rotates about a second axis extending at an angle, preferably perpendicular to the first axis. This means that respective nozzles perform, for example, a rotation in a first direction, i.e., in a horizontal rotation, and simultaneously a rotation in a second direction, i.e., in a vertical rotation. A respective nozzle design arrangement enables particularly thorough cleaning.

According to a preferred embodiment, the spraying device can also be movable in the hopper up and down and/or be moveable laterally to and fro and/or be pivotable with respect to the longitudinal axis L of the hopper. The spraying device can also be designed such that it is movable manually.

It is for the respective spraying devices with multiple jets advantageous if the different spray angles (e.g., angles between the jet and the longitudinal axis L of the hopper) differ from each other.

Advantageously, the hopper comprises a cover. This can be an additional splash guard cover (e.g. made of transparent material or with inspection glass) being placed on the top edge of the hopper, or the cover of the hopper already provided in the filling machine. It is thereby with a closed hopper prevented that splashing water exits to the exterior. The spraying device is advantageously attached to the cover. This has the advantage that no additional supports must be provided in the hopper which would be an obstacle in particular during the actual operation of the filling machine when filling the filling material. The spraying device can thereby be integrated in an inexpensive and easy manner into the filling machine. The cover advantageously comprises a connection for the cleaning medium, i.e. for a corresponding preferably flexible line, a hose, etc. The connection in this region does not interfere with the functions of the filling machine and, for example, a hose or respective piping can be connected permanently or temporarily as needed. However, a pivot-in device attached to the hopper is also possible.

The filling machine advantageously comprises a controller controlling the intermediate cleaning program, i.e. an intermediate cleaning process prior to a product change. This controller comprises a memory in which different cleaning programs are stored. A suitable cleaning program matching a particular product can therewith be selected. This is important since the individual products being processed during a work shift of a filling machine differ greatly from each other. By storing different programs for different products, cleaning medium and energy can be saved, thereby ensuring reliable and adequate cleaning.

If a filling element is according to a preferred embodiment disposed in the direction of conveying the pasty substance or the cleaning medium, in particular a stuffing tube or an inline grinder or a filling flow separator, then the areas of the accessories exposed to the product can also be cleaned by the cleaning medium. The outlet opening for the cleaning medium is then located at the respective outlet end of the filling element.

The cleaning liquid exiting via the outlet opening from the filling machine is discarded, for example, via a drain line, in particular at the end of the intermediate cleaning step. However, it is also possible to provide a return line via which the cleaning medium is at least partially in circulation C returned to the spraying device. A strainer or a filter is then advantageously disposed between the outlet opening and the spraying device and largely retains dirt particles. Circulating the cleaning medium in the circulation saves much energy and water. It is also possible to return only a portion of the cleaning medium, and to add fresh, e.g. hot medium.

At least one spraying device is advantageously provided which is arranged such that a jet is injected into the inlet of the conveying mechanism. The individual cells of the conveying mechanism, in particular of the vane cell pump, can thereby be mechanically cleaned by the jet. If the conveying mechanism rotates, all of the cells can be reached by the jet.

It is particularly advantageous if the controller controls the cleaning process such that the conveying mechanism is operational during the cleaning process, at least temporarily. It is there possible that the conveying mechanism runs in the forward direction but also alternatingly in the forward or reverse direction. If the conveying mechanism runs not only in one direction, then this brings about the advantage that even better mixing and cleaning occurs. At least temporarily presently means very generally that the conveying mechanism is driven during the intermediate cleaning step at least temporarily, either while cleaning liquid is distributed with the spraying device onto the hopper inner wall, or also after the spraying device has distributed the cleaning liquid onto the hopper inner wall, but prior to the product change.

In a method for intermediate cleaning, a cleaning medium is distributed onto the hopper inner wall with the aid of a spraying device, while the conveying mechanism of the filling machine is at least temporarily operating during the intermediate cleaning step. Intermediate cleaning is presently understood to be the cleaning operation prior to a product change, where at least one product change occurs during a work shift.

In the method according to the invention, the filling machine is therefore first operated with a first product. An intermediate cleaning step is carried out at the end of this step by the spraying device followed by the product change and operation of the filling machine with a second product. The steps intermediate cleaning and product change and operation of the filling machine with a second product, i.e. steps b) and c) are repeated 0 to n times (n∈IN). The main cleaning process then takes place manually at the end of the work shift, in which, as was previously also described in connection with prior art, the conveyor is opened, the individual components of the conveying mechanism, such as in particular the rotor and the pump impeller, are removed and cleaned. The main cleaning process is then performed manually with a pressure washer or with foam. After the main cleaning process, a new work shift can begin. It is possible that an intermediate cleaning step is carried out by use of the spraying device prior to the manual main cleaning process which facilitating the manual main cleaning process considerably. In the simplest case, the spraying device is held and moved manually.

The cleaning parameters of the intermediate cleaning step are in step b) adjusted in dependence of the product last processed. A respective cleaning program is in dependence of the product last processed preferably selected from a plurality of cleaning programs stored in a controller. Cleaning agent and energy can thereby be saved and proper cleaning is ensured. It is therefore possible that a certain cleaning program is in the controller assigned to one or more products. The operator can therefore enter into the controller which product was processed and the controller automatically selects an associated cleaning program.

Respective parameters comprise, inter alia, for example, the temperature of the respective cleaning medium and/or the pressure of the cleaning medium and/or the duration of the intermediate cleaning process. The amount of a cleaning agent possibly added and the duration of the rinsing process with clean water are stored as parameters.

BRIEF DESCRIPTION OF THE DRAWINGS

The invention shall be explained below in more detail with reference to the following figures.

FIG. 2 shows a simplified schematic representation of a filling machine according to a further embodiment of the present invention.

FIG. 3a also shows a simplified schematic representation of a filling machine according to a further embodiment of the present invention.

FIG. 3b shows a simplified schematic representation of a filling flow separator.

FIG. 7c shows a simplified schematic top view onto a rotating nozzle wheel.

FIG. 7d shows the nozzle wheel shown in FIG. 7c in a lateral view.

FIG. 7e shows a sectional view through the nozzle wheel shown in FIG. 7c.

FIG. 7f schematically shows a spraying device pivoted towards the longitudinal axis L of the hopper.

DETAILED DESCRIPTION OF THE INVENTION

Figure 1:
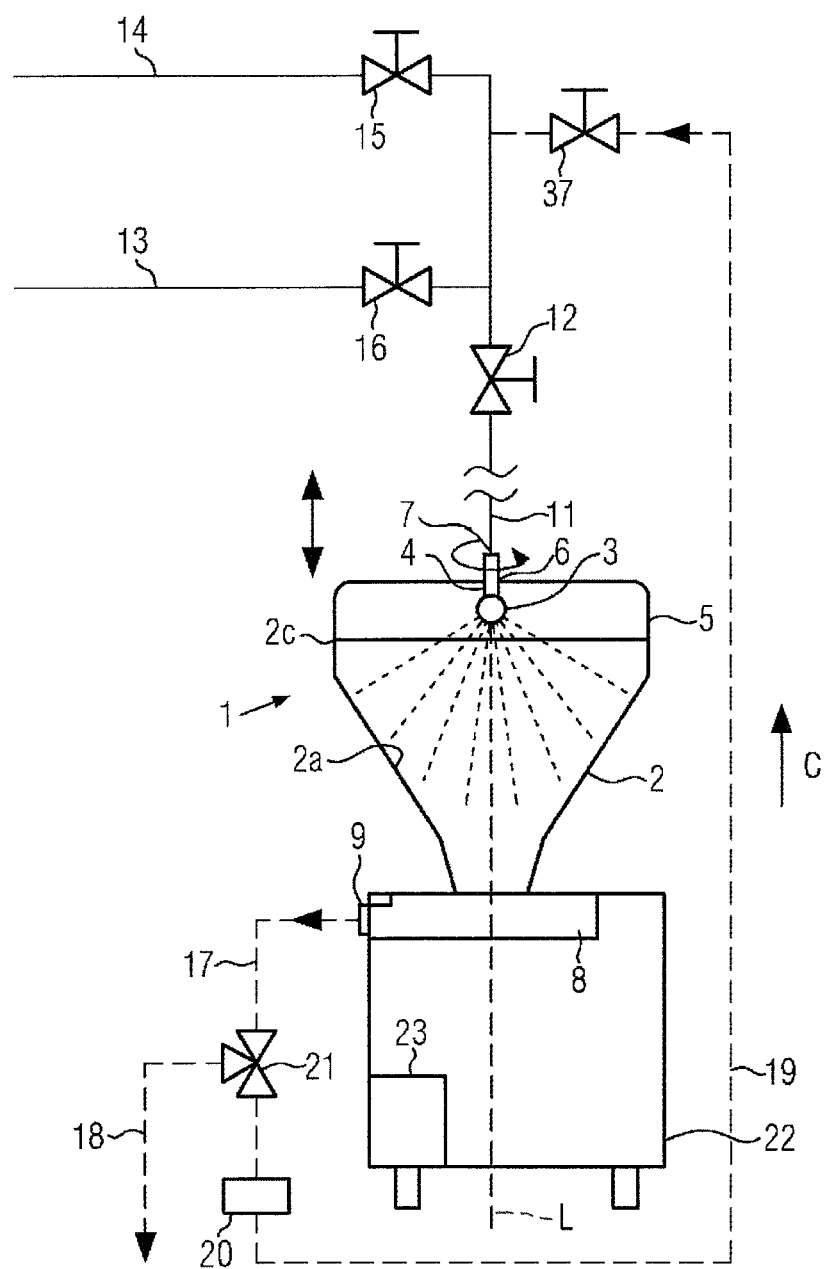
FIG. 1 shows a simplified schematic representation of a filling machine according to one embodiment of the present invention.

FIG. 1 shows a sectional view in simplified schematic representation through a filling machine according to the invention. A filling machine 1 comprises a hopper 2 for filling in a pasty substance. The hopper in this embodiment comprises a cover 5 which is removable and rests on the upper edge 2c of hopper 2. Although not shown, a supply line for a pasty substance can be provided in the upper part of the hopper. Alternatively, the pasty substance can for this be introduced into the hopper also through removed cover 5. A conveying mechanism is provided at the lower end of conical hopper 2, in this example, in the form of a vane cell pump 8, with which the pasty substance is conveyed in the direction of an outlet 9. The filling machine furthermore comprises a housing 22 and a controller 23.

Figure 8:
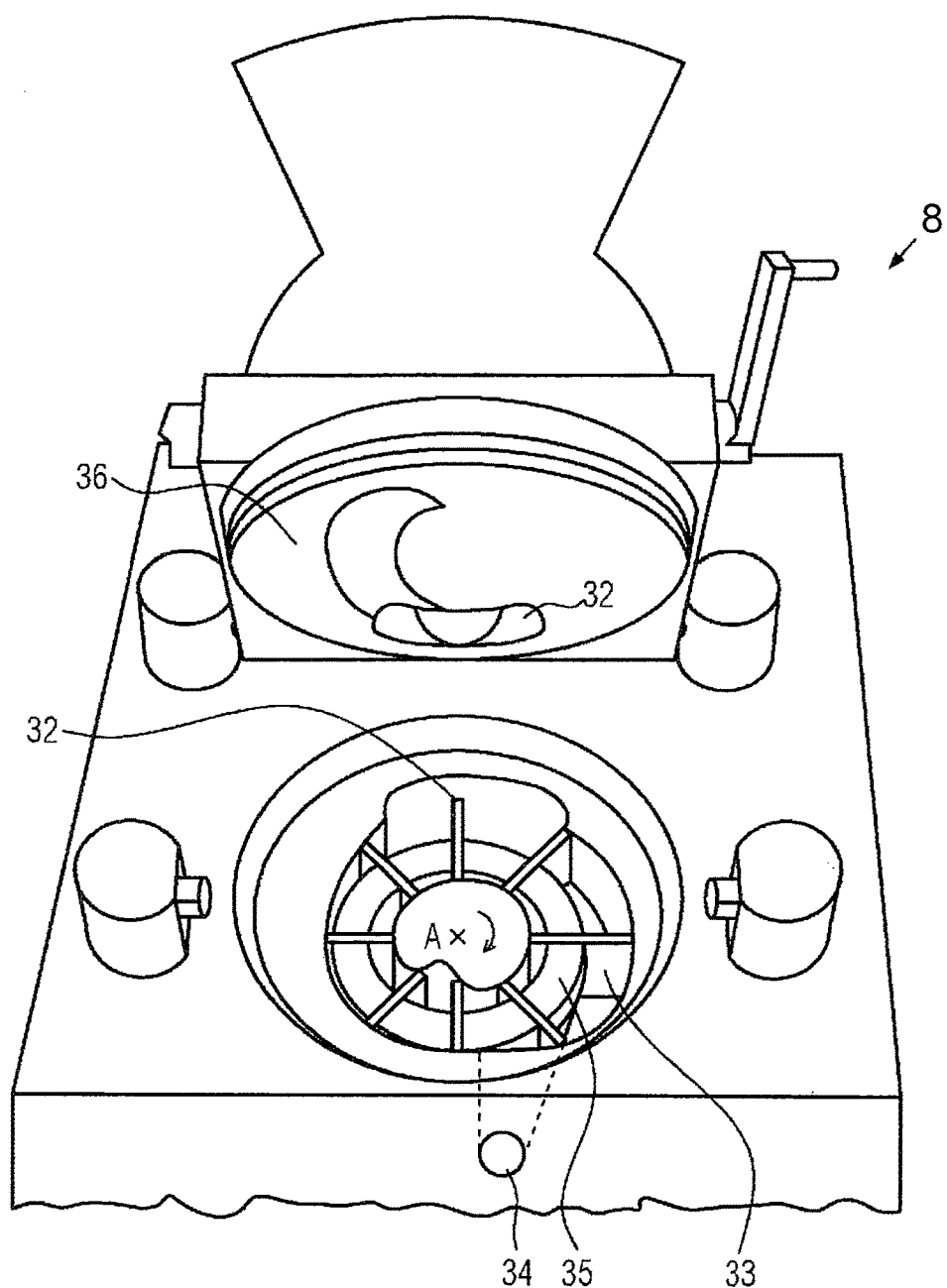
FIG. 8 shows a perspective representation of a conveyor device as it can be used in the filling machine according to the invention.

FIG. 8 shows a vane cell pump 8 which can be used, for example, in a filling machine according to the present invention. A corresponding vane cell pump 8 for conveying the pasty substances comprises a pump housing and an inlet 32 for the pasty substance and an outlet 34 connected to outlet 9, illustrated in FIG. 1. Inlet 32 is connected to the outlet of hopper 2, illustrated in FIG. 1, via which the pasty substance is supplied to vane cell pump 8. Vane cell pump 8 in the pump housing comprises a preferably eccentrically disposed rotor 35 that can be set into rotation and is driven by a pump shaft about axis A. Rotor 35 comprises radially displaceably vanes 33 which together with the inner contour of the pump housing or the inner wall, the base of the pump housing, and cover 35 form vane cell chambers or conveying cells, respectively.

The filling machine according to the present invention now comprises a spraying device 3 which is disposed either in hopper 2 or above hopper 2, i.e. above edge 2c. Several spraying devices 3 can be provided simultaneously. The location and configuration of the spraying devices is determined depending on the application. The spraying device can be attached with a respective support or mounted directly on the filling machine, or be held by a separate support such that it is located within or above the hopper. The spraying device 3 is via a supply line 4 attached to the hopper, presently preferably to cover 5. For this purpose, the cover has a corresponding opening 6. Furthermore, a connection 7 is provided via which a supply line for a cleaning medium can be connected. The supply line for the cleaning medium is preferably formed as being flexible at least in the connection area, in particular as a hose, so that it is sufficiently flexible such that cover 5 can be opened, can in particular be flipped open. Through supply line 11, a cleaning medium, for example, lye and/or water, can via a further line 13 be supplied through supply line 14. Respective valves 12, 15, 16, which can also be formed as control valves, are there provided in the lines. Water and the cleaning medium, presently the lye, can with the control valves there be mixed with a certain ratio. The piping is only by way of example. Beyond that, also a heating device—not shown—can be provided with which the cleaning medium, presently the lye, and/or the water can be heated to a predetermined temperature.

Water jets distributed over the inner surface 2a of hopper 2 can via spraying device 3 impact and clean the hopper inner surface and any assembly components. The cleaning liquid enters conveying mechanism 8 and is by conveying mechanism 8 conveyed through the vane cells in the direction towards outlet 9. The entire area exposed to the product is thereby exposed to the cleaning agent. The motion of the conveying mechanism also improves cleaning of the individual chambers. The jets of water or jets of cleaning medium remove product residues in the hopper area and the conveying mechanism area, where the cleaning agent and product mixture subsequently moves through the conveying mechanism to outlet 9 and is discarded either through drain line 17, 18 or at least partially returned to circulation C via return line 19. For this purpose, a respective valve 21 can be provided via which either the entire cleaning medium or a portion is passed into line 19. As the conveying mechanism transports the cleaning medium and product mixture, no separate pump is necessary for return line 19. It is advantageous if a strainer or filter is provided in return line 19 which can retain coarse impurities. The returned cleaning medium can then again be supplied to spray head 3. For example, valve 37 is then opened. If only a portion of the cleaning medium is returned, then fresh cleaning medium and/or water can additionally be added such that a sufficient amount of cleaning medium is supplied to the spraying device.

No further filling element is shown in FIG. 1. The embodiment shown in FIG. 2 corresponds to the embodiment shown in FIG. 1, though only the essential components are shown. However, it is also possible that a stuffing tube 24 is disposed at the end of the conveying mechanism, where outlet end 9 is then located at the end of the stuffing tube. This means that also the interior of the stuffing tube can be cleaned during the cleaning process.

FIG. 3a corresponds to the previous embodiments, while a filling flow separator 25 is there disposed in the direction of conveying the pasty substance or the cleaning medium, respectively, downstream of conveying mechanism 8. As illustrated in FIG. 3b, the filling flow separator 25 has a first line section 25' that splits into several line sections, presently three line sections. For example, devices 29 for adjusting the flow rate can then also be provided in the individual lines. This filling element then comprises three outlet ports 9a, 9b, 9c, through which the cleaning and product mixture again exists the machine. Not only conveying mechanism 8 and the hopper but also the filling flow separator as well as the device for adjusting the flow rate 29 can also be cleaned in the same intermediate cleaning step.

Figure 4A:
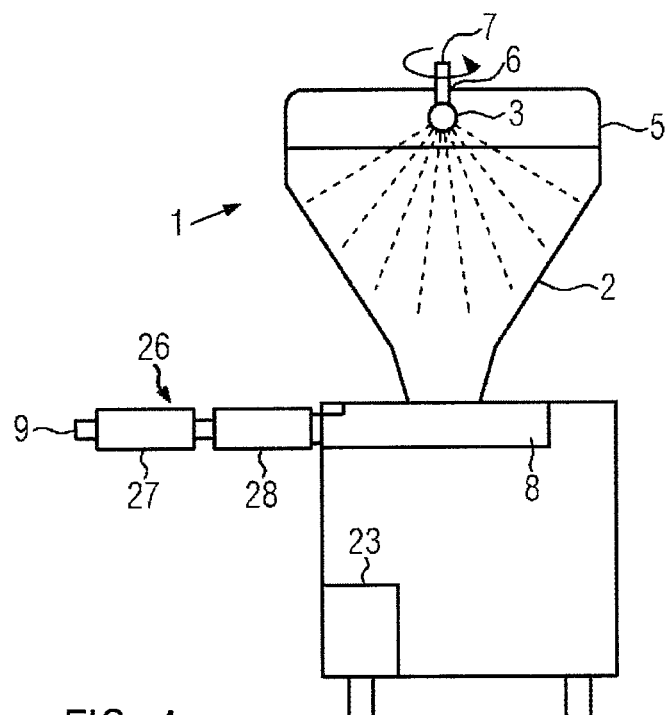
FIG. 4a shows a simplified schematic representation of a further embodiment of the present invention.

It is also possible, as shown in FIG. 4a, that an inline grinder 26 is provided as a filling element which there comprises two chopping stages 28, 27 that can chop the pasty substance and move it towards outlet 9. The cleaning product medium can thereby also clean the areas of the inline grinder exposed to the product from the inside. It is particularly advantageous if the knives in the chopping stages 28, 27 are during the cleaning process moved in a known manner, since the motion of the knives improves the cleaning effect.

Figure 4B:
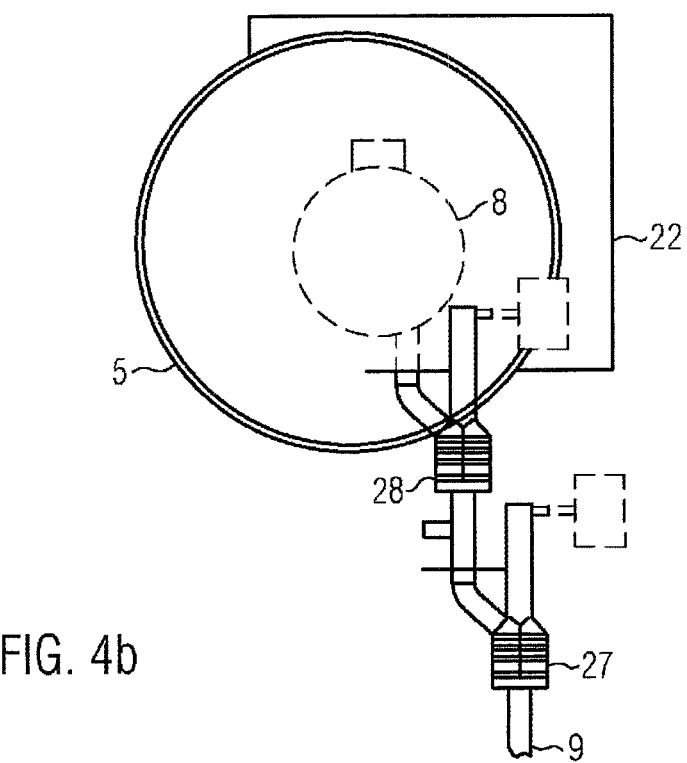
FIG. 4b shows a top view of an inline grinder as a filling element.

In the embodiment described in connection with FIGS. 2 through 4 with the filling elements, for example, the respective outlet 9 or 9a, b, c, respectively, is then connected to line 17.

Figure 7A:
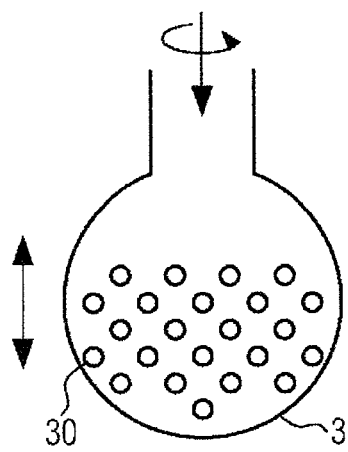
FIG. 7a shows a simplified schematic lateral view of a spraying device in the form of a spray ball.
Figure 7B:
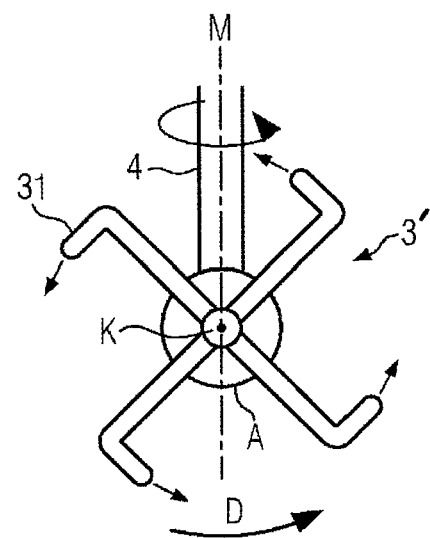
FIG. 7b shows a simplified schematic representation of a spraying device in the form of a nozzle wheel rotating about two axes.

FIGS. 7a-c show various embodiments of spraying devices.

The spraying device is configured such that inner surface 2a of the hopper is cleaned as uniformly as possible by the cleaning medium or the water jets, respectively. According to a particular embodiment, as shown in FIG. 7a, the spraying device is formed as a spray ball 3. The spray ball 3 has multiple openings 30 through which the cleaning medium is sprayed onto hopper inner wall 2a. Openings 30 can be provided as slits or holes in the hollow ball. The openings are arranged such that the spray angle of the jet is not constant relative to the longitudinal axis L of the hopper. In order to prevent the respective jet from impacting at the same spot of the hopper inner wall, the spray head, i.e. the spray ball, is designed as being rotational. For this reason, the spray head, presently the spray ball, is designed rotating about its center axis as shown by the rotating arrow. The spray head can there be designed such that, for example, it is driven by the water pressure and thereby performs a rotating motion. However, the spray head can also be moved e.g. electrically or pneumatically by a respective drive to perform a rotary motion. Alternatively or additionally, it is also possible to move spray head 3 by a respective drive mechanism from the top to the bottom of the hopper, as shown by the arrow. It is there then advantageous, for example, if supply line 4, illustrated in FIG. 1, is formed as a flexible hose.

FIG. 7b shows a further embodiment of a spraying device which is designed as a nozzle head 3'. This head comprises several, e.g. four nozzles 31, two of which are respectively disposed oppositely and rotated by the water pressure in the direction of arrow D about an axis K. Axis K is at an angle to axis M, preferably perpendicular to a center axis M of supply line 4. The nozzle head additionally also rotates about axis M, as shown by the arrow. This results in very uniform cleaning of the hopper, where also the cover and the hopper base can be adequately cleaned.

FIG. 7c shows a top view of another embodiment of a head in the form of a nozzle wheel. Cleaning medium can be supplied via supply line 4 or the wheel 40 or its cavity, respectively, to the individual nozzle 31. Nozzles 31 are arranged evenly around the circumference of the wheel 40. The nozzle wheel 3" can either, as shown in FIG. 7d, be moved up and down, where line 4 is again preferably formed as a flexible hose. Additionally or alternatively, the respective nozzles 31 can also be tilted such that their spray angle relative to longitudinal axis L of the hopper differs for different nozzles 31, as illustrated in FIG. 7e. Even distribution of the cleaning medium can also be achieved in that either a respective head is moved to and fro relative to the central longitudinal axis of the hopper or pivoted away from longitudinal axis L, as illustrated in FIG. 7f. The specific embodiments of the spraying devices are presently only by way of example.

Figure 5:
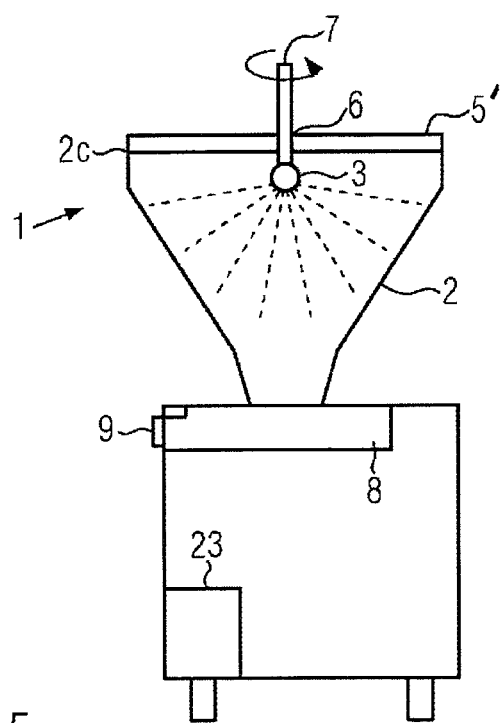
FIG. 5 shows a simplified schematic representation of a further embodiment of the present invention.

As shown in FIG. 5, a special splash guard cover 5' can as an alternative to cover 5, which is already part of the filling machine, be provided and can be placed on upper edge 2c of hopper 2 and is preferably made of transparent material or has at least one inspection glass for monitoring the cleaning operation.

Figure 6:
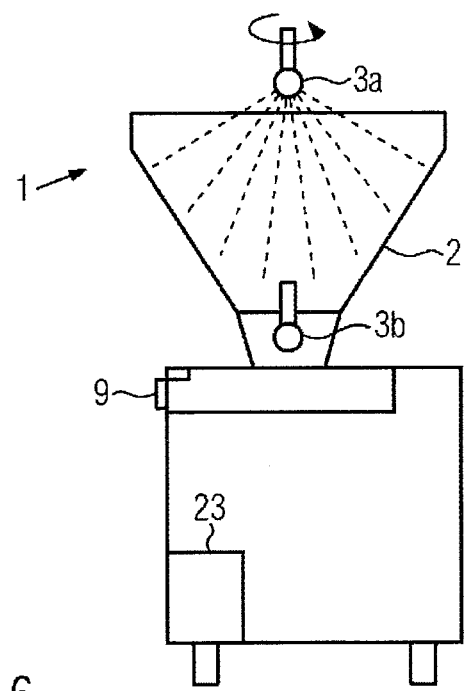
FIG. 6 shows a simplified schematic representation of a further embodiment of the present invention.

As shown in FIG. 6, an additional spray head 3b can also be arranged in the area above inlet 32, illustrated in FIG. 8, of the conveying mechanism such that at least one jet sprays directly into the conveying mechanism. Spray head 3b is in addition to spray head 3a. During the operation of the filling machine, this spray head 3b can be moved away from this area, in particular be moved upwardly.

Figure 9:
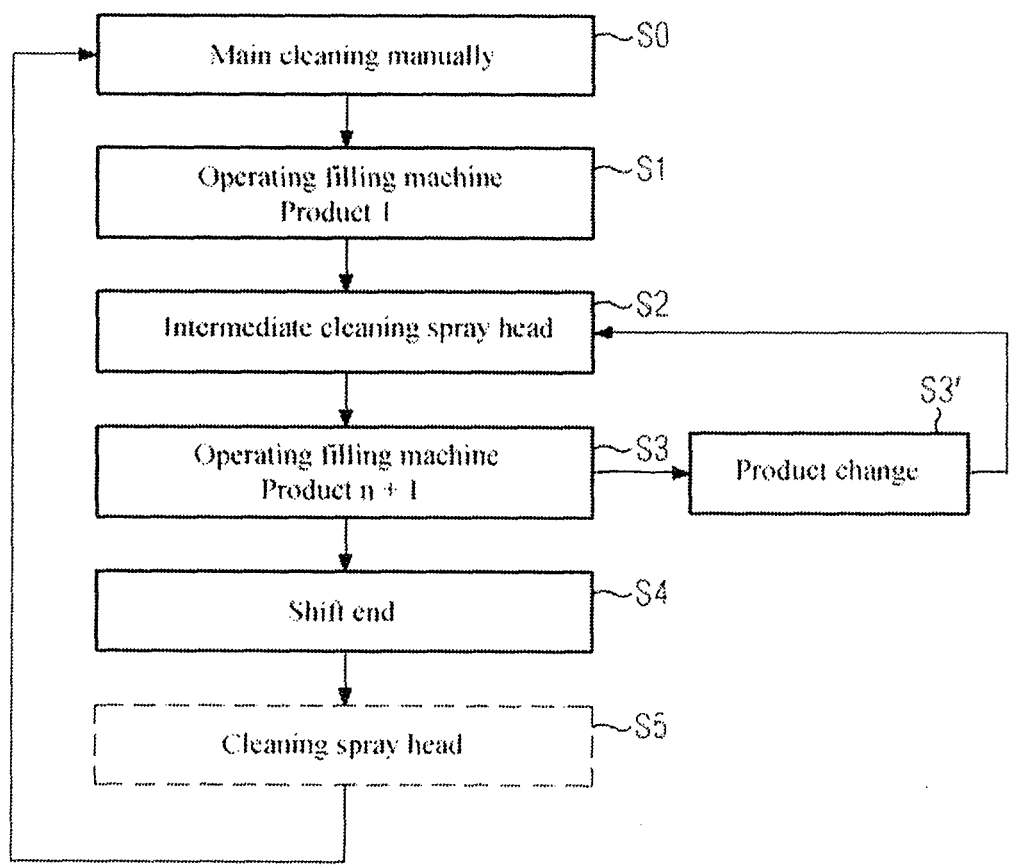
FIG. 9 shows a flowchart for the method according to the invention.

The method according to the invention is described below in more detail in connection with FIG. 9. As is apparent from FIG. 9, the filling machine is during a work shift in a first step S1 operated with a first product 1. It was prior to step 1 ensured that the filling machine was sufficiently cleaned, namely, in a manual cleaning step S0. A main cleaning operation is performed, for example, as follows. All areas exposed to the product are cleaned manually. The procedure is in particular as follows:

1. Conveying mechanism 8, presently vane cell pump 8, is first opened in that cover 36 is opened, presently pivoted upwardly. All components to be cleaned, in particular rotor 35, pump vanes 33, are then dismantled.
2. The components removed are cleaned manually, in particular by use of a high-pressure cleaner or by a low pressure process using cleaning agents, in particular foam cleaner.
3. The areas of the filling machine exposed to the product are then cleaned, such as the hopper interior, the feeding area, i.e. the transition from the hopper to the conveying mechanism, e.g. with the feeder arm and the counter arm, the inlet area to the conveying mechanism, the outlet area from the conveying mechanism as well as downstream filling elements, if present.
4. Finally, the components removed are re-assembled and the conveying mechanism is closed.

If a product changes take place during a work shift in which several different products are processed, an intermediate cleaning step occurs in step S2, in which the areas exposed to the product are cleaned by use of the spraying device, preferably automatically. For this, the operator either enters the necessary parameters, such as:

cleaning agent pressure, cleaning agent temperature, duration of the cleaning process with the cleaning agent, amount of cleaning agent added, water temperature, water pressure, water temperature [sic], duration of water rinsing, preferably the operator selects an intermediate cleaning program from a memory of controller 23 that matches the first product.

In the intermediate cleaning step 11, the cleaning medium is therefore, for example, through line 13, 11 first supplied to spraying device 3. The cleaning agent is via spraying device 3 applied uniformly onto inner surface 2a of the hopper, such that product residues clinging thereto are removed from inner surface 2a. While and/or after liquid is applied to inner surface 2a of the hopper by spraying device 3, the conveying mechanism 8 runs and transports the product and cleaning agent mixture in the direction towards outlet 9. The product and cleaning agent mixture can then through line section 17 and open valve 21 via a filter 20 and return line 19 with respectively open valves 37, 12 again be supplied to spraying device 3. At the end of the cleaning time, the product and cleaning agent mixture can be discarded through drain lines 17, 18 with the valve respectively open. It is also possible not to circulate the cleaning agent in the circulation and to discard it immediately through lines 17, 18. In a non-automated program, the operator can then let the cleaning process run long enough until relatively clear cleaning agent leaves the filling machine through line 18. Subsequent to the cleaning process with the cleaning medium, in particular the lye, a rinsing step can further be carried out using water in the same manner as described above.

After the intermediate cleaning process is in step S2 completed, the filling machine can then be operated with a second product n+1 (n∈IN). At least one product change takes place.

After the end of operation of the filling machine with the second product, or the n+1$^{st}$ product, the operator or the controller decides whether the work shift is now terminated or whether a product change again takes place. If, as shown in FIG. 9, a product change again takes place in step S3', then, as previously described, intermediate cleaning is first performed according to step S2 and the filling machine is then operated with the next product. Steps S3 and S2 are repeated until the operator or the controller determines that the shift end is reached. The main manual cleaning S0 previously described then takes place at the shift end in step S4, so that the filling machine is sufficiently cleaned for the next work shift.

Intermediate cleaning according to step S2, i.e., intermediate cleaning using the spraying device, can also take place between the shift end S4 and the main cleaning process S0.

The individual parameters can be easily determined experimentally and adapted to different sizes of filling machines and products, where the individual parameters can be determined such that it is monitored that sufficient cleaning has taken place when a clear cleaning medium exits outlet 9.

If the filling machine in the hopper comprises a stirring device and/or a conveyor device, such as an auger or a feeder arm, it is advantageous if such device(s) is/are driven during the intermediate cleaning step, in particular, at least temporarily when the cleaning liquid is distributed by the spraying device.

What is claimed is:

1. A filling machine, in particular for the production of sausages with a hopper for filling in a pasty substance and a conveying mechanism for conveying said pasty substance in the direction towards an outlet opening, wherein:
   at least one spraying device is provided above or within said hopper for distributing a cleaning medium onto said hopper inner wall during an intermediate cleaning and a controller controls said intermediate cleaning process such that the conveying mechanism runs at least temporarily during the intermediate cleaning process.

2. The filling machine according to claim 1, wherein:
   said at least one spraying device is designed as a spray head or a nozzle head, in particular a nozzle wheel.

3. The filling machine according to claim 1, wherein:
   said at least one spraying device is designed to be movable for distributing a cleaning medium, and can rotate preferably about a first axis and/or can rotate about a second axis extending at an angle, preferably perpendicular to said first axis.

4. The filling according to claim 1, wherein:
   said at least one spraying device is moveable up and down and/or movable laterally to and fro and/or is pivotable relative to the longitudinal axis of said hopper for distributing a cleaning medium in said hopper.

5. The filling machine according to claim 1, wherein:
   said hopper comprises a cover, where preferably said at least one spraying device is attached at said cover.

6. The filling machine according to claim 5, wherein:
   said cover comprises a connection for the cleaning medium.

7. The filling Machine according to claim 1, wherein:
   different cleaning programs are stored in a memory of said controller.

8. The filling machine according to claim 1, further comprising:
   a filling element, in particular a stuffing tube or an inline grinder, or a filling flow separator, is arranged in the direction of conveying said pasty substance or said cleaning medium.

9. The filling machine according to claim 1, wherein:
   said cleaning medium can exit from said filling machine through said drain opening and can be discarded either via a discharge line, or a return line is provided via which said cleaning medium can be returned at least partially to circulation to said at least one spaying device.

10. The filling machine according to claim 1, wherein:
    said at least one spraying device for distributing said cleaning medium is arranged such that at least one jet sprays into the inlet of said conveying mechanism.

11. The filling machine according to claim 1, wherein:
    said conveying mechanism runs forward or alternatingly runs forward or backward.

12. A method for intermediate cleaning of a filling machine, according to claim 1, wherein:
    cleaning liquid is during intermediate cleaning distributed with said at least one spraying device onto said hopper inner wall, and a conveying mechanism of said filling machine runs at least temporarily during said intermediate cleaning process.

13. The method according to claim 12, wherein the following steps are performed during the operation of said filling machine:
    a) operating said filling machine with a first product,
    b) intermediate cleaning of said filling machine,
    c) changing the first product and operating said filling machine with a second product,
    where steps b) and c) are repeated 0 to n times (n∈IN) and then in step
    d) manually cleaning said filling machine.

14. The method according to claim 13, further comprising the step of:
    performing intermediate cleaning prior to the step of manually cleaning said filing machine.

15. The method according to claim 12, wherein:
    cleaning parameters are in dependence of a last product processed set for respective intermediate cleaning, in particular in said step of intermediate cleaning of said filling machine, and preferably a corresponding cleaning program is selected in dependence of a last product processed, preferably automatically, from a plurality of cleaning programs stored in a controller.

16. The method according to claim 15, wherein:
    the cleaning parameters comprise a temperature of the cleaning medium and/or a pressure of the cleaning medium and/or a duration of the step of intermediate cleaning of said filling machine.

17. A filling machine for filling an elongated strand with a pasty substance comprising:
- a hopper having an upper end adjacent an upper edge with an upper opening adapted to receive the pasty substance and a lower end having a lower opening;
- a cover fitted on the upper opening;
- a conveying mechanism adjacent the lower opening of the lower end of said hopper;
- an outlet attached said conveying mechanism, whereby the pasty substance processed by said conveying mechanism is forced from said outlet;
- a spraying device adjacent the upper end of said hopper;
- a cleaning medium supply line attached to said spraying device and a cleaning medium; and
- a controller associated with said spraying device,
- whereby the cleaning medium is controllably spayed from said spraying device into the upper end of said hopper in between dispensing different pasty substances providing intermediate cleaning before a complete manual cleaning of the filling machine.

18. A method of providing an intermediate cleaning of a filing machine having a hopper, conveying mechanism, and an outlet for filling an elongated strand with a pasty substance comprising the steps of:
- ensuring that the filling machine is fully clean;
- operating the filling machine with a first pasty substance product;
- completing the filling of the first pasty substance product;
- spaying a cleaning medium inside the hopper;
- conveying the cleaning medium through the hopper, conveying mechanism, and out of the outlet while a controller controls the conveying mechanism so as to run at least temporarily during the intermediate cleaning;
- operating the filling machine with a second pasty substance product;
- completing the filling of the second pasty substance product; and
- manually fully cleaning the filling machine,
- whereby the hopper, conveying mechanism, and the outlet are intermediately cleaned between processing of the first pasty substance product and the second pasty substance product and before said step of manually fully cleaning the filling machine.

* * * * *